_(United States Patent — Kanehira et al., Patent Number: 5,009,630, Date of Patent: Apr. 23, 1991)_

[54] CHAIN FORMED BY LINK ELEMENTS OF IDENTICAL SHAPE

[75] Inventors: Makoto Kanehira; Takerou Nakagawa; Yasumasa Tsubakimoto; Kouji Tanaka; Toshio Takahashi; Masaaki Ikeda, all of Osaka, Japan

[73] Assignee: Tsubakimoto Chain Co., Osaka, Japan

[21] Appl. No.: 411,555

[22] Filed: Sep. 22, 1989

[30] Foreign Application Priority Data

Oct. 21, 1988 [JP] Japan .................. 63-264199

[51] Int. Cl.$^5$ .............................................. F16G 13/02
[52] U.S. Cl. ...................... 474/211; 474/227
[58] Field of Search ............ 474/206, 211, 212, 226, 474/227, 232–235; 59/84, 90; 198/853

[56] References Cited

U.S. PATENT DOCUMENTS

| | | | |
|---|---|---|---|
| 2,065,931 | 12/1936 | Alling | 474/211 X |
| 2,586,268 | 2/1952 | Smith | 474/211 |
| 2,766,635 | 10/1956 | Schwarzkoff | 474/211 X |
| 3,768,631 | 10/1973 | Wahren | 474/211 X |
| 4,597,747 | 7/1986 | Lapeyre | 474/227 |

Primary Examiner—Thuy M. Bui
Attorney, Agent, or Firm—Flynn, Thiel, Boutell & Tanis

[57] ABSTRACT

A chain includes a plurality of identical link elements each including a main body part with a cantilevered connecting part integrally formed at one end thereof. The connecting part includes an enlarged rounded head portion and a narrower neck portion extending between the head portion and the main body part. The main body part has a rounded recess and a narrow slot formed in a first surface thereof. The slot adjoins an end of the recess opposite the connecting element. The slot extends from the recess to adjoin a side surface of the main body. Confining sections extend from the surface of the main body adjacent the slot so as to overlie opposite sides of the recess. The recess, slot and confining sections together define an opening in the first surface which has substantially the same shape as the connecting element. The chain is formed by inserting the connecting part of one link element into the recess of an adjacent link element and pivoting the one link element about its head portion such that its neck portion is received in the slot of the adjacent link element and its head portion is captured in the recess by the overlying confining sections.

9 Claims, 6 Drawing Sheets

CHAIN FORMED BY LINK ELEMENTS OF IDENTICAL SHAPE

FIELD OF THE INVENTION

This invention relates to a chain formed by link elements of identical shape, and particularly to a chain suitable for use in an atmosphere of relatively high temperature, such as an oven.

BACKGROUND OF THE INVENTION

An example of a chain formed by link elements of identical shape is disclosed in U.S. Pat. No. 4,597,747. The chain of said patent, however, has a drawback in that the shape of the link elements is rather complicated. Moreover, the degree of freedom in the connecting portion of the adjacent link elements is limited, so that it is not capable of sideward bending.

Moreover, since the link elements of the chain are made of formed plastics, its coefficient of friction is relatively low; and consequently, it is not possible to use it by directly winding it around a drum making use of friction. Also, it is not possible to drive it by sandwiching it between a pair of driving elements. Thus, its scope of possible use is rather limited.

On the other hand, FIGS. 14 and 15 hereof depict a similar chain 20 made of ceramics. The chain 20 is composed by a plurality of slat members 21 connected by connecting elements 23 each of which is received in a receiving portion 22 formed in the slat member 21. The connecting element 23 is prevented from coming off by means of confining sections 24 which project from both sides of the receiving portion 22 in the form of a pair of "eaves".

However, since the connecting elements 23 are not capable of supporting the conveyed articles, the chain 20 cannot be held horizontally. Consequently, the torsion between the slat member 21 and the connecting elements 23 may not be corrected and merely accumulated. In addition, since there are two differently shaped members, costs for the required molds are rather high.

SUMMARY OF THE INVENTION

The present invention provides a chain comprising a plurality of link elements each of which comprises a main body part and a connecting part integrally formed with each other, said connecting part projecting from said main body part and having a curved surface section and a reduced neck portion, and said main body part including a recess for receiving said curved surface section of the adjacent link element. A narrowed slot portion for receiving said neck portion of the adjacent link element is contiguous with said recess at an end of said recess opposite said connecting part, and confining sections covering a portion of said recess project from both sides of said recess adjacent said narrowed slot portion in the form of eaves.

In order to form a chain, the connecting part of an adjacent link element is inserted into said recess of a first link element in a first direction and is brought beneath the confining sections. Then said neck portion may be received by said narrowed slot portion as the adjacent link element is pivoted to extend in a second direction wherein the link elements are substantially aligned. By repeating said procedure with respect to the adjacent link elements, a long chain may be formed.

BRIEF DESCRIPTION OF THE DRAWINGS

FIGS. 1 to 13 show embodiments of this invention in which:

FIG. 1 is a plan view of a first embodiment of a link element;

FIG. 2 is a sectional view along line II—II of FIG. 1;

FIG. 3 is a view depicting how the adjacent link elements are connected;

FIG. 4 is a plan view of the connected link elements when a pulling force is applied thereto;

FIG. 5 is a view, generally similar to FIG. 4, of a second embodiment of the invention;

FIG. 6 is a sectional view along line VI—VI of FIG. 5;

FIG. 7 is a view, generally similar to FIG. 1, of a third embodiment;

FIG. 8 is a sectional view along line VIII—VIII of FIG. 7;

FIG. 9 is a sectional view along line IX—IX of FIG. 7;

FIG. 10 is a sectional view along line X—X of FIG. 7;

FIG. 11 is a plan view of the connected link elements of the third embodiment when a pushing force is applied thereto;

FIG. 12 is a view of the third embodiment generally similar to FIG. 4;

FIG. 13 illustrates a fourth embodiment of this invention;

DETAILED DESCRIPTION

Figure 1:
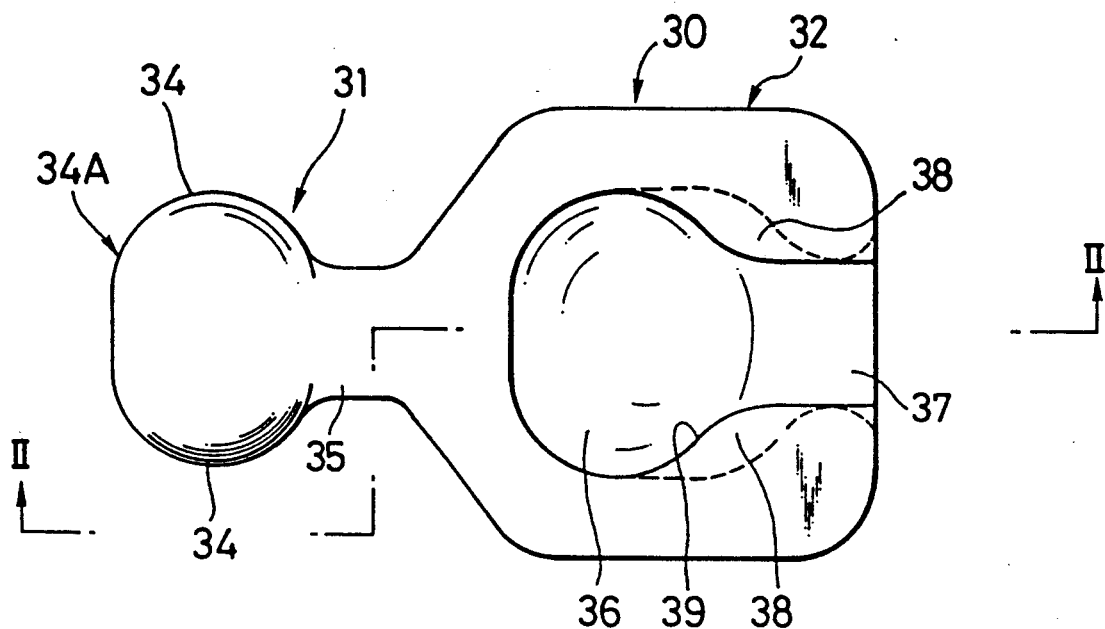
Figure 2:
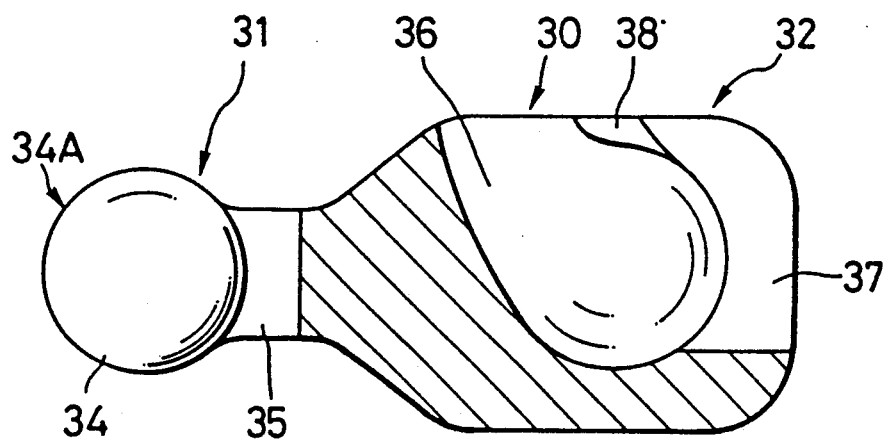
Figure 3:
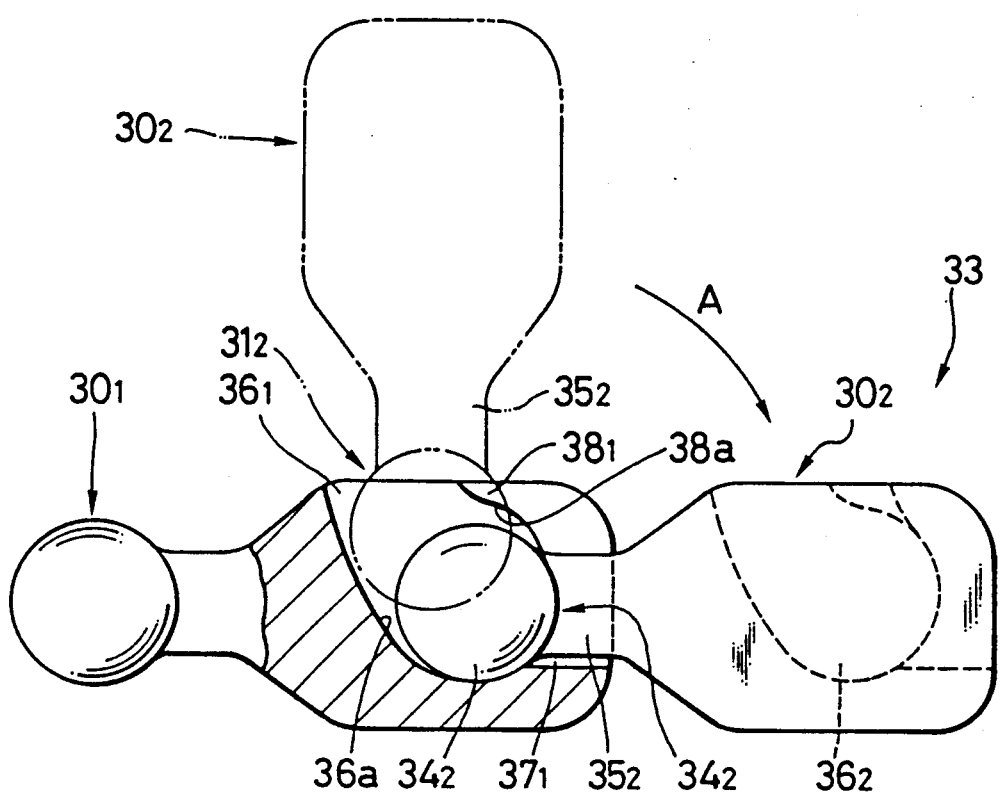

A first embodiment will be described with reference to FIGS. 1 to 4.

A one-piece link element 30 comprises a connecting part 31 integrally formed with a main body part 32. Plural link elements 30 are connected in series as in FIG. 3 so as to form a chain 33.

The connecting part 31 projects in cantilever fashion from the main body part 32 and has, at the longitudinal end thereof, an enlarged rounded head portion 34A.

A neck portion 35 extends between the main body part 32 and the head portion 34A and has a diameter which is smaller than the maximum distance "1" between the curved end surfaces 34 of the rounded portion 34A.

In this embodiment, the rounded head portion 34A is transversely (i.e. sidewardly) elongated and has the convex rounded surfaces 34 formed on opposite sides thereof, which surfaces are substantially semi-spherical. In cross section (see FIG. 1), the rounded portion 34A has a diameter which substantially corresponds to the diameter of the side surfaces 34.

The main body part 32 of one link element 30 is adapted to receive the connecting part 31 of an adjacent link element 30. The main body part 32 includes a pocket-like recess 36 to receive the whole of the rounded part 34A; and a narrowed portion 37 for receiving the neck portion 35, which portion 37 is contiguous with the recess 36 at an end of the recess 36 opposite said connecting part 31. Confining sections 38 in the form of a pair of overhanging projections or eaves project outwardly over both sides of said recess 36 near the narrowed portion 37 to thus partially cover the recess 36. The interior of the recess 36 is substantially spherical.

The main body part 32 is generally a rectangular prism. The connecting part 31 projects from a side surface of the main body part 32, and lies between the planes of the upper and lower surfaces of the main body part. The narrowed portion 37 is a slot formed in the same surface (upper in FIG. 2) of the main body part 32 as the recess 36 and extends through the main body part 32 from the recess 36 to adjoin a side surface of the main body part opposite the connecting part 31. The slot 37 adjoins the recess 36, and the confining sections 38 overlie opposite side portions of the recess 36, whereby a substantially keyhole-shaped opening 39 is formed in the upper surface of the main body part 32 (see FIG. 1). The opening 39 has substantially the same shape as the connecting element 31.

In order to form a chain by connecting the link elements 30, first and second link elements $30_1$, $30_2$ (FIGS. 3-4) are brought into a perpendicularly crossing relationship with each other. The connecting part $31_2$ of the second link element $30_2$ is inserted downwardly into the recess $36_1$ of the first link element $30_1$ such that the whole of the rounded head portion $34A_2$ may be received in the recess $36_1$. As the former is inserted into the latter as mentioned above, the connecting part $31_2$ z is moved downwardly along the inclined front surface $36a$ of the recess $36_1$ so as to be moved rearwardly beneath the inner surface $38a$ of the confining sections $38_1$. Then the second link element $30_2$ is pivoted as shown by arrow A in FIG. 3 so that the neck portion $35_2$ is brought into the narrowed slot portion $37_1$. The two link elements $30_1$ and $30_2$ are thus brought into a straightened relationship with the rounded head portion $34A_2$ abutting those surface portions of the recess $36_1$ which adjoin the slot or narrowed portion $37_1$, to complete the connecting operation. In this position, the confining sections $38_1$ overlie opposite side portions of the head portion $34A_2$ (FIG. 4) so as to vertically capture it in the recess $36_1$.

It will be appreciated that the connecting element of a third link element (not shown) is inserted into the recess $32_2$, and a similar connecting operation may be carried out likewise with respect to the link elements thereafter.

Figure 4:
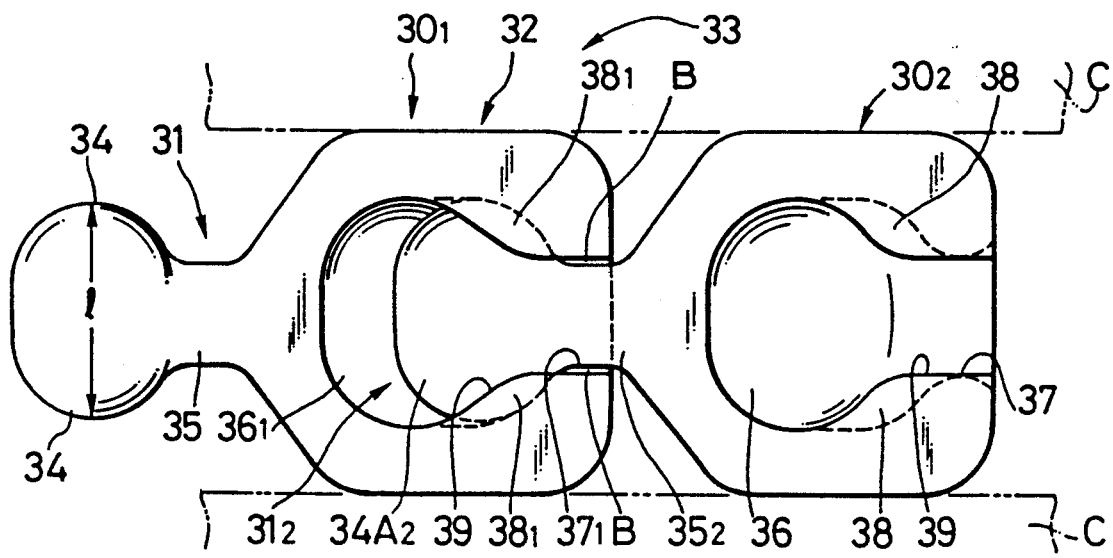

If the chain 33 thus formed is pulled in use as shown in FIG. 4, the link element $30_2$ cannot disengage in the longitudinal direction since the enlarged head portion $34A_2$ of the connecting part $31_2$ is too large to pass through the narrowed slot portion $37_1$. Moreover, sideward (i.e., horizontal) bending of the chain 33 is permissible, since the connecting part $31_2$ and the recess $36_1$ contact along curved surfaces, and there are gaps B between the neck portion $35_2$ and the narrowed slot portion $37_1$. Furthermore, bending of the chain 33 in a vertical direction is also permissible, since the enlarged head portion $34A_2$ of the connecting part $31_2$ is prevented from coming out of the recess $36_1$ due to the overlying confining sections $38_1$.

The chain according to the first embodiment has the following advantages:

1. The link elements 30 have a simplified and identical shape, which contributes to a reduction in the number of differently shaped parts, the total number of parts, and the manufacturing cost.

2. The link elements are capable of supporting conveyed articles and torsion may be rectified.

3. Even if there is a curved portion in the conveyance path, the chain can move along the path effecting a smooth sideward bending.

4. By making the link element from a ceramic material, the coefficient of friction may be increased; and the chain may be driven by a driving mechanism C (FIG. 4) which sandwiches the chain. Furthermore, since the chain can freely bend, the chain may be easily wound around a drum.

5. The chain, if made of ceramics, may be used in a hot atmosphere, such as an oven.

In case the chain is driven by a sandwiching driving mechanism as mentioned above, concave and/or convex portions (not shown) may be formed in both side faces of the link elements for engagement with the driving mechanism.

Figure 5:
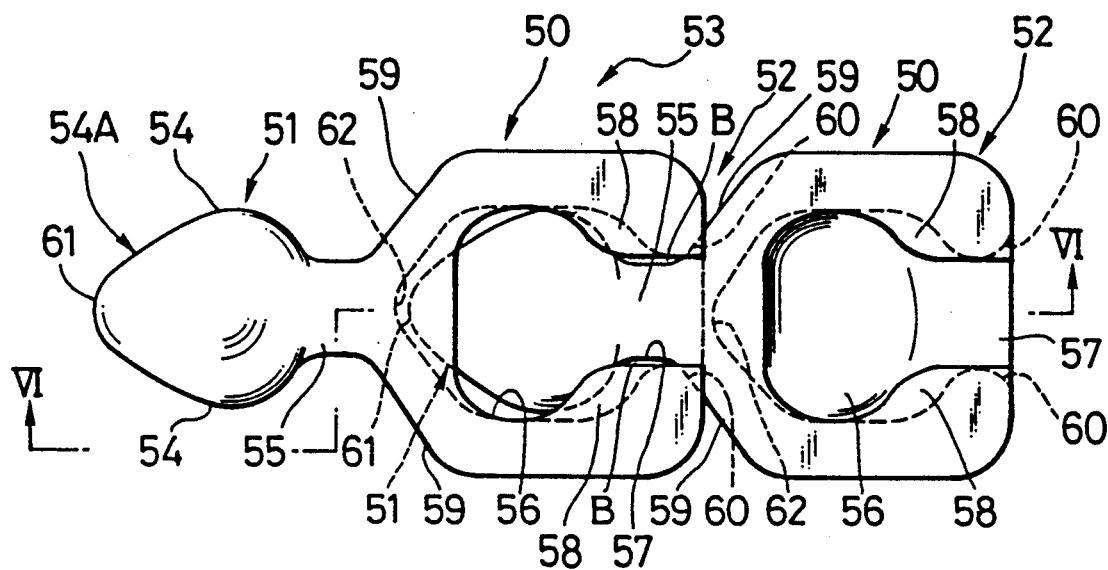
Figure 6:
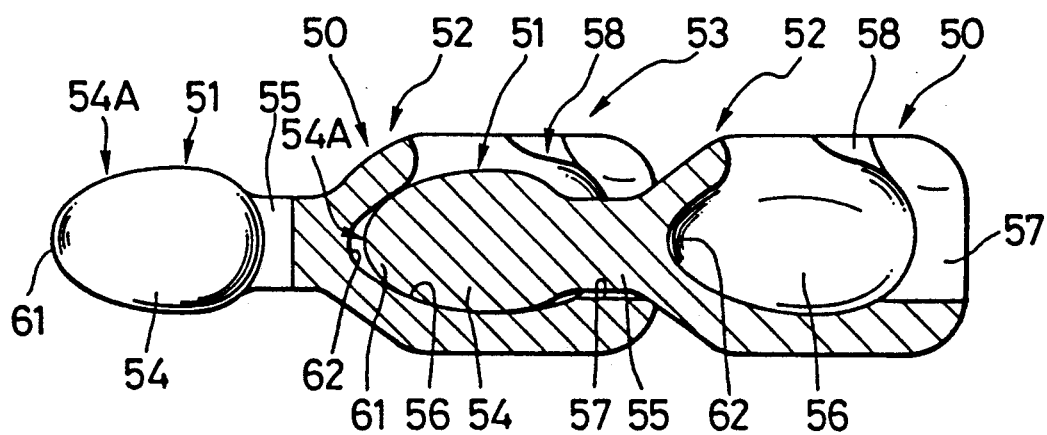
Figure 7:
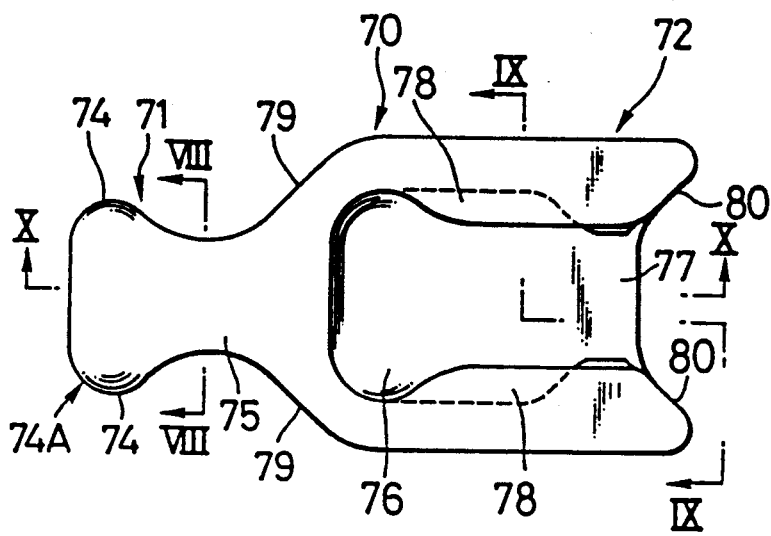
Figure 9:
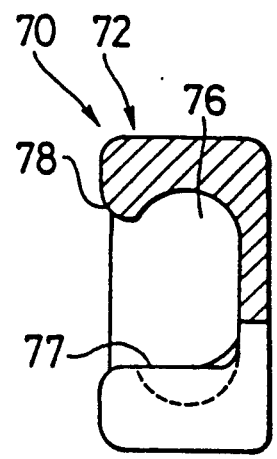
Figure 8:
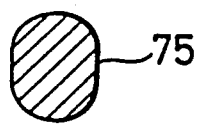
Figure 10:
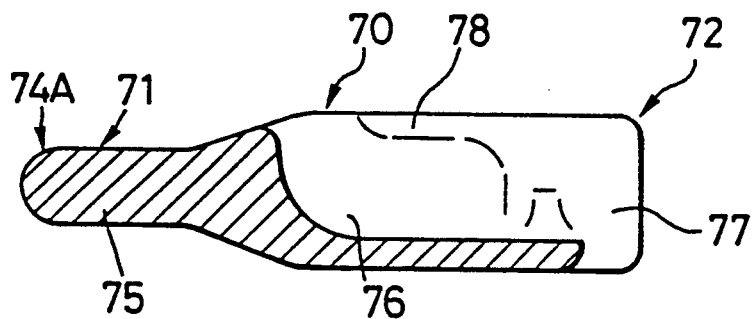

FIGS. 5 and 6 illustrate a chain 53 according to the second embodiment of this invention. Chain 53, formed by connecting one-piece link elements 50, is adapted to be capable of functioning as a so-called "push-drive" chain.

The shape of the link element 50 resembles that of the first embodiment, but the forward end of the main body part 52 has a pair of outwardly converging inclined surfaces 59 from which the connecting part 51 projects. At the outward end corners of the narrowed slot portion 57, complementary outwardly diverging inclined surfaces 60 are formed for abutting the inclined surfaces 59 of the adjacent link element 50. The rounded head portion 54A is more elongated than the head portion 34A of the first embodiment, terminating in a longitudinally projecting tip 61. The recess 56 includes an adjoining groove 62 extending toward the connecting part 51 for receiving the tip 61 of the connecting part 51 of the adjacent link element 50. The groove 62 does not adjoin the upper surface of the main body part 52.

The link elements 50 may be assembled to form a chain 53 in a manner similar to the assembling procedure of the first embodiment.

When a pushing force is applied in a longitudinal direction, the inclined surfaces 60 abut against the complementary inclined surfaces 59 of the adjacent link element 50, and the tip 61 of the connecting part 51 is received in the groove 62 of the adjacent link element 50 so that the joined links function similar to a rigid bar. This makes it possible to transmit a pushing driving force. Concentration of the pressure may be avoided by the fact that there are a plurality of complementary abutting portions 59 and 60 as mentioned above.

If the chain thus formed is pulled in use, as shown with respect to the first embodiment in FIG. 4, the rightward link element 50 (FIG. 6) cannot disengage in the longitudinal direction since its connecting part 51 may not pass through the narrowed slot portion 57 of the leftward link element 50.

In this embodiment as well, a sideward (i.e., horizontal) bending of the chain 53 permissible since the curved side surfaces 54 contact the walls of the recess 56, and there are gaps B between the neck portion 55 and the narrowed slot portion 57. Furthermore, bending of the chain 53 in a vertical direction is also permissible since the connecting part 51 is prevented from coming out of the recess 56 due to the confining sections 58.

Accordingly, the second embodiment has, in addition to the advantages of the first embodiment, the advantage that it is particularly suitable as a push-drive chain if made of ceramics since the strength against compression is about 10 times higher than the strength against tension in case of ceramics.

FIGS. 7 to 12 depict a third embodiment of this invention, in which link elements 70 forming a chain 73 are capable of driving by either pulling or pushing.

The shape of the link element 70 resembles that of the first embodiment, but the recess 76 is somewhat elongated longitudinally and the bottom thereof is flat. The connecting part 71 includes a head portion 74A defining convex curved side surfaces 74, and a neck portion 75, each of which project in substantially flat configuration. That is, the head portion 74A and neck portion 75 are of generally uniform vertical thickness. The forward end of the main body part 72 has a pair of outwardly converging inclined surfaces 79. At the rearward end of the main body 72, a pair of complementary outwardly diverging inclined surfaces 80 are formed.

The link elements 70 may be connected to form a chain 73 in a manner similar to the first embodiment.

Figure 11:
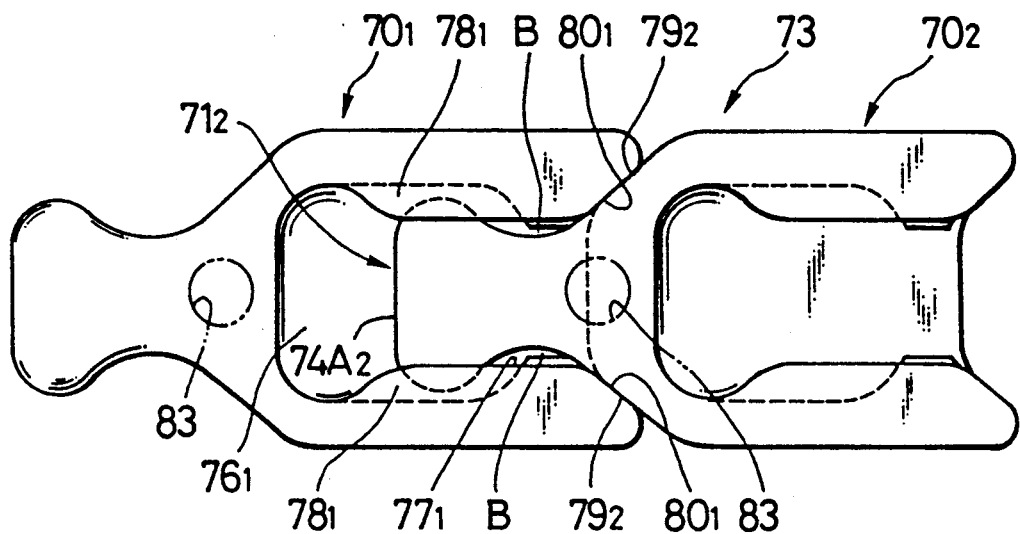

When a pushing force is applied in a longitudinal direction of the chain 73, as shown in FIG. 11, the inclined surfaces $80_1$ abut against the complementary inclined surfaces $79_2$, and the tread portion $74A_2$ of the connecting part $71_2$ is stably received in the recess $76_1$ so that the links function just like a rigid bar. This makes it possible to transmit a pushing driving force.

Also, a sideward bending of the chain 73 is permissible since there are gaps B between the neck portion $75_2$ and the narrowed slot portion $77_1$. Moreover, should the chain be bent in a vertical direction, the connecting part $71_2$ will not come out of the recess $76_1$ owing to the confining sections $78_1$ overlying the head portion $74A_2$.

Figure 12:
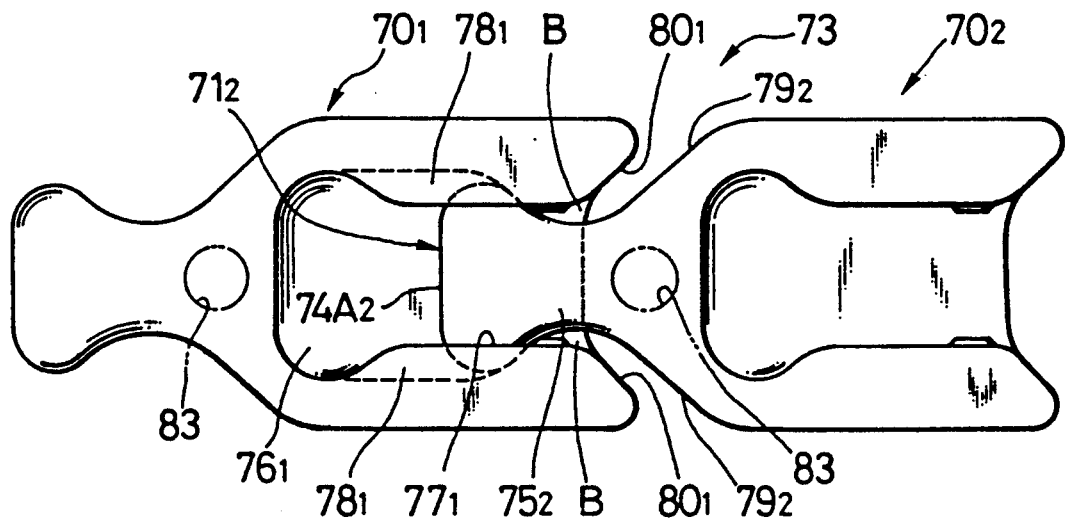

On the other hand, a pulling drive is also possible as shown in FIG. 12. In this case as well, a sideward bending is permissible because the contacting surfaces between the connecting part $71_2$ and the recess $76_1$ are curved surfaces and there are gaps B between the neck portion $75_2$ and the narrowed slot portion $77_1$.

In this third embodiment, it is preferable to provide a through hole 83 in the neck portion of the link element 70 when use in a hot oven is intended. Such a structure will serve to promote circulation of air within the oven. It will be appreciated however that it is not necessary to provide such a hole to all of the link elements.

Figure 13:
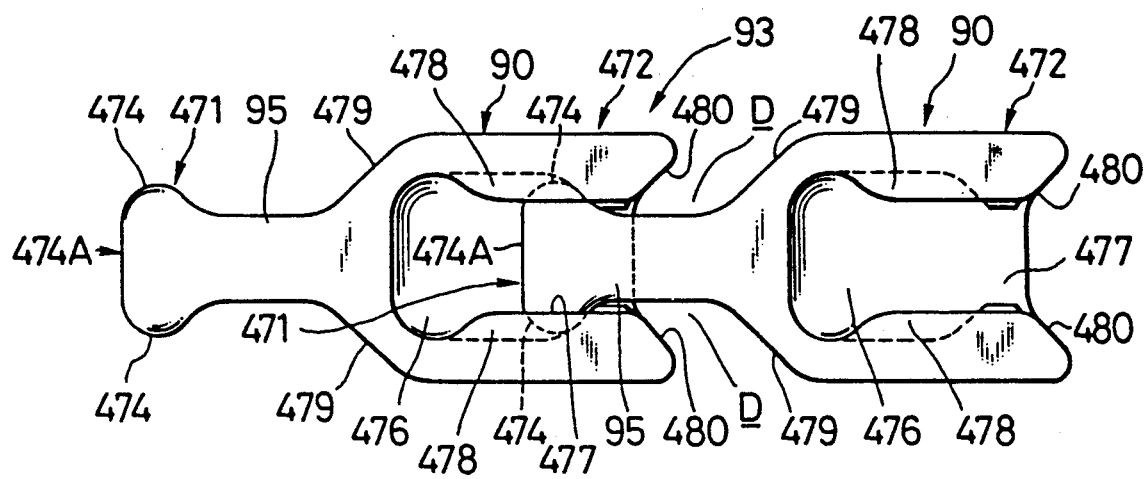
Figure 14:
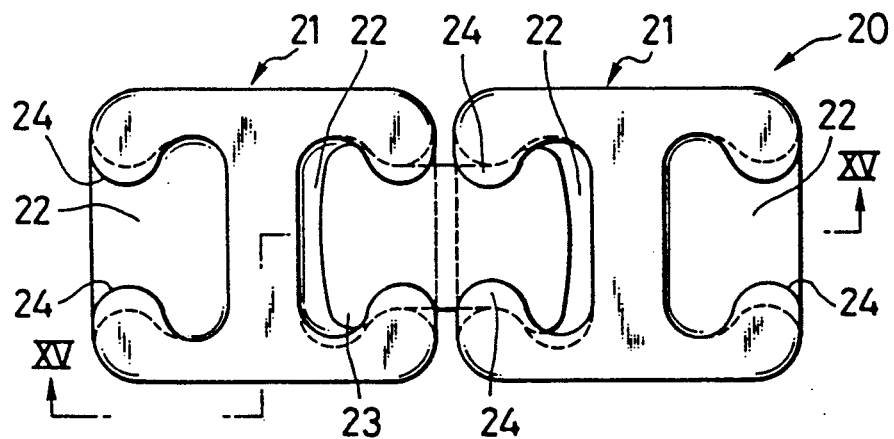
FIG. 14 illustrates a prior art chain in a view similar to FIG. 4.
Figure 15:
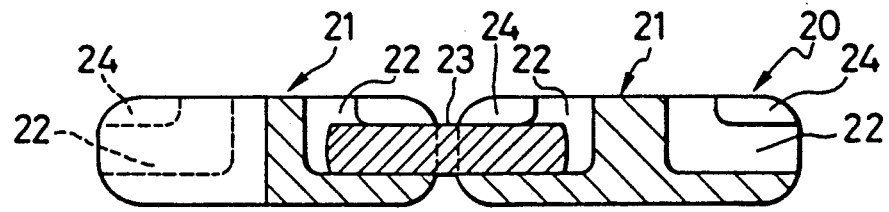
FIG. 15 is a sectional view along line XV—XV of FIG. 14.

FIG. 13 illustrates a fourth embodiment of this invention. The link element 90 is similar to the link element 70 of the third embodiment. The distinction lies in the fact that the link element 90 has no through holes, but the neck portion 95 is somewhat elongated instead. When the chain 93 thus formed is used in pulling, the spaces D created between the adjacent link elements 90 serve to promote circulation of hot air in the oven. The other features of this embodiment are common with the embodiment shown in FIGS. 7-12, so that the same reference numerals as used in FIGS. 7-12, but having a leading "4", denote elements analogous to those depicted in FIGS. 7-12.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A chain comprising a plurality of ceramic link elements, each of which includes a main body part and a connecting part integrally formed with each other, said connecting part projecting from said body part and having a curved surface head portion and a reduced neck portion;

the main body part having, at its point of connection to the neck portion, inclined end surfaces which converge inwardly toward one another for connection to the neck portion;

said main body part including (1) a recess for receiving said curved surface head portion of an adjacent said link element and (2) a narrowed slot portion for receiving said neck portion of the adjacent link element, said narrowed slot portion being contiguous with said recess at an end of said recess opposite said connecting part;

said main body part also including confining sections covering a portion of said recess, said confining sections projecting from both sides of said recess adjacent said narrowed slot portion in the form of overhanging eaves, whereby the connecting part of the adjacent link element is inserted in a first direction into said recess of a first said link element so that the head portion is brought beneath the confining sections, and then said neck portion of the adjacent link element is received by said narrowed slot portion of the first link element as the adjacent link element is pivoted about its connecting part to extend in a second direction wherein the joined link elements are substantially aligned; and said main body part adjacent the outer end of said narrowed slot portion having inwardly converging end surfaces which are inclined substantially the same as and complimentary to the first-mentioned end surfaces, the first-mentioned inclined end surfaces of said adjacent link element abutting against the second-mentioned inclined end surfaces of said first link element when the chain is subjected to a pushing force.

2. A chain according to claim 1, wherein the recess includes a groove so as to receive a tip of the connecting part of the adjacent link element.

3. A chain according to claim 1, wherein said link elements each have an identical structure.

4. A chain according to claim 1, wherein a through hole is formed in the neck portion of at least one of the link elements.

5. A chain comprising:

a plurality of joined connecting link elements made of a ceramic material, each said connecting link element being substantially identical and of a generally one-piece construction, and each said connecting link element being joined directly between first and second adjacent said connecting link elements;

each said connecting link element including a main body part which is of a block-like configuration and a connecting part which is integrally joined to said main body part and which projects outwardly in a cantilevered fashion from one end of said main body part;

said connecting part including a neck portion which is joined to the end of said main body part and projects in cantilevered fashion outwardly therefrom, said neck portion being of reduced cross section relative to said main body part;

said connecting part also including a head portion integrally joined to an outer free end of said neck portion, said head portion having a sideward dimension which is greater than the sideward dimension of said neck portion and having convex curved surfaces formed on opposite sides thereof;

said main body part having a recess formed interiorly thereof for accommodating therein said head portion, said recess having a mouth which opens upwardly through an upper surface of said main body part for permitting the head portion of an adjacent said link element to be moved through the mouth into the recess;

said main body part also having a narrow slot formed therein and extending from said recess so as to open outwardly through the other end of said main body part, said narrow slot having a width which is smaller than the sideward extent of said head portion for retaining said head portion in said recess, said slot also opening upwardly through the upper surface of said main body part for communication with said mouth;

said main body part having confining portions, disposed adjacent said upper surface substantially adjacent the inner end of said narrow slot, which overhang said recess for capturing the head portion in the recess; and a rear end surface of said main body part having a pair of inclined first side surfaces which converged with respect to one another adjacent the outer end of the slot, and a front end surface of the main body part having a pair of inclined second side surfaces which converge toward one another for merger with the neck portion, the inclined first side surfaces on one link element being inclined substantially the same as and abutting the inclined second side surfaces of an adjacent link element and transferring pushing forces from link element to link element when the chain is subjected to a pushing force.

6. A chain according to claim 5, wherein the mouth and the slot, where they open upwardly through the upper surface of the main body part, define a generally T-shaped opening, and wherein the recess as formed interiorly of the main body part projects rearwardly from the mouth so that the head portion can be captivated below the confining portions.

7. A chain according to claim 5, wherein the head portion has a forwardly projecting tip, and wherein the main body part has an undercut groove which projects forwardly from the recess for accommodating therein the projecting tip on the head portion of the adjacent link element.

8. A chain according to claim 5, wherein the recess is elongated lengthwise of the respective link element and has a length greater than the length of the head portion so that the head portion has at least limited slidable displacement lengthwise of the respective recess in which the head portion is engaged.

9. A chain according to claim 8, wherein a front end of the head portion of a rear adjacent link element is displaced rearwardly from a front end of the recess of a front adjacent link element when the inclined second side surfaces on the rear adjacent link element abut the inclined first side surfaces on the adjacent front link element.

* * * * *

UNITED STATES PATENT AND TRADEMARK OFFICE
CERTIFICATE OF CORRECTION

PATENT NO. : 5 009 630
DATED : April 23, 1991
INVENTOR(S) : Makoto Kanehira et al It is certified that error appears in the above-identified patent and that said Letters Patent is hereby corrected as shown below:

Column 6, line 2; after "projecting from said" insert
---main---.

Signed and Sealed this

Twenty-ninth Day of December, 1992

Attest:

DOUGLAS B. COMER

*Attesting Officer*   *Acting Commissioner of Patents and Trademarks*